April 23, 1968    M. A. COX    3,379,232

NUTCRACKER

Filed June 3, 1964

INVENTOR.
MAYO A. COX

3,379,232
NUTCRACKER
Mayo A. Cox, 306 N. Meridian St.,
Tallahassee, Fla. 32301
Filed June 3, 1964, Ser. No. 372,187
3 Claims. (Cl. 146—13)

This invention generally relates to improvements for nut shell crackers and more particular to new features incorporated to more fully utilize a hand tool of this sort.

An object of the invention is to provide a nut shell cracker which is simple in construction, easy to use, well adapted for its intended purpose and relatively inexpensive to manufacture.

Another object of the invention is to provide a nut shell cracker with novel means for cracking and crushing shells of pecans, walnuts, Brazil nuts and other nut shells more efficiently.

An additional object of the invention is to provide a nut shell cracker whereby the nut shells can be cracked and crushed sufficiently in most cases, to enable the removal of the nut meats whole, from the cracked and crushed shells, without the aid of nut picks and other devices.

A more general object of the invention is to provide a nut shell cracker whereby, no adjustments are necessary to the device to crack and crush various size nuts.

These together with other objects and advantages which will become subsequently apparent reside in the details of construction and operation, as more fully hereinafter described and claimed, reference being had to the accompanying drawing forming a part hereof, wherein like numerals refer to like parts throughout, and in which FIG. 1 is a perspective view of a device constructed in accordance with the invention, with the base and the handle being in their open position, as in actual use.

Figure 1:
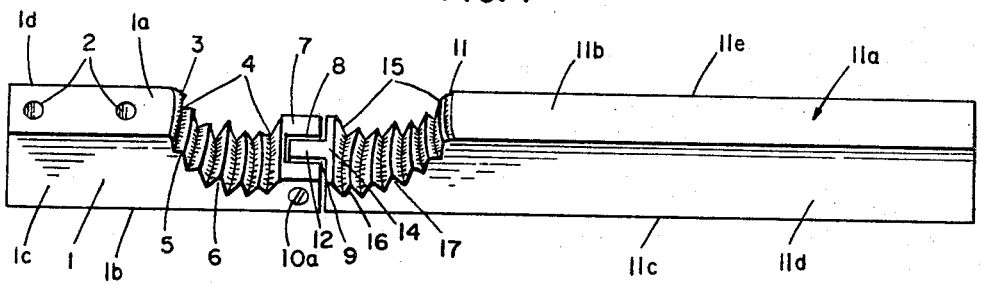
Figure 2:
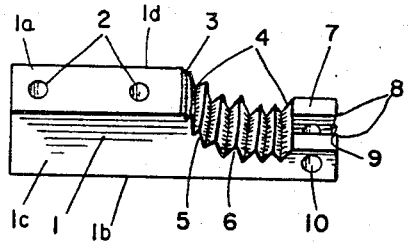
FIG. 2 is a perspective view of the base.
Figure 3:
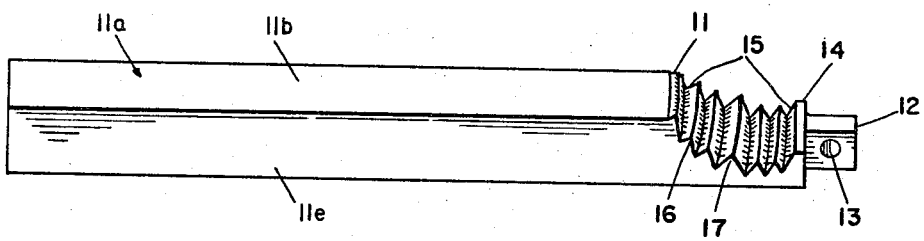
FIG. 3 is a perspective view of the handle.
Figure 4:
FIG. 4 is a side view of a threaded bolt fastener.

Referring now more particularly to the accompanying drawing wherein like and corresponding parts are indicated by similar reference characters, numeral 1 designates the base 1 having a flat top 1a, flat bottom 1b and sides 1c and 1d. Said base has mounting openings 2 extending from its top to its bottom and in one end portion 3 a concave recess 4 in said top with a series of lateral sharp convex cutting teeth 5 extending crosswise between said sides and integral with said base. One tooth 6 of said series of teeth is slightly higher and larger than the remaining teeth. Said recess 4 terminates at shoulder 7 which is bifurcated at 8 providing a slot 9 and aperture 10 extends through the end of said base laterally of said slot.

A handle 11a is of a similar cross-section to base 1 and has a flat top 11b, flat bottom 11c, and sides 11d and 11e. The end 11 of said handle has a lug 12 which extends within slot 9 of said base and is pivotally connected thereto by a bolt 10a extending through opening 10 and opening 13 of lug 12 in threaded engagement with said base. Adjacent lug 12 there is provided a shoulder 14. Also adjacent shoulder 14 there is provided a concave recess 15 in top 11b of said handle in which are positioned a series of sharp convex cutting teeth 16 extending between the sides of said handle and are integral with the handle. One of said teeth 16 in the medial portion thereof and which is designated as cutting tooth 17 is slightly higher and larger than the remainder of said cutting teeth 16. Cutting teeth 5 and 6 are positioned in base 1 for being opposite cutting teeth 16 and 17 respectively of said handle when top 11b of said handle is brought towards top 1a of said base.

In the operation of the device, the handle and the base, as shown in FIG. 1, as placed in their open position with said handle being extended in longitudinally outward from said base. Said recess provided in said base section in such a manner as to allow for various size nut positioned to be cracked therein. A nut is placed onto concave recess 4 in base portion adjacent shoulder 7, and onto said sharp convex cutting teeth 5 and 6, while handle 11a is pivoted in a vertical plane until contact is made simultaneously by the said slightly higher and slightly larger sharp convex cutting teeth 6, and 17, whereby a high mechanical leverage is obtained as any one versed in the art can plainly see, as pressure is applied downwardly on the nut, the said sharp convex cutting teeth 6, and 17, having very small sharp contacting surfaces, very easily sinks into the nut shell at both its top and bottom, starting the cracking operation. As said teeth 6, and 17, advance said other sharp convex teeth 5, and 16, also commences their shell contacting cycle, cutting and crushing the shell of the nut easily.

The foregoing is considered as illustrative only of the principles of the invention, further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

Having thus completely and fully described the invention, what is now claimed as new is as follows:

1. A nut cracker comprising a base having a top, bottom and sides connecting said top and bottom, a concave recess adjacent one end of said base in said base top, a series of convex teeth integral with said base and extending in said recess between said sides, a medial tooth of said series of teeth being of greater height than the remainder of said series of teeth, and a bifurcated shoulder at said base end, a handle having a top, bottom and sides connecting said handle top and bottom and an end face extending laterally of said sides, a concave recess in said handle top adjacent said end face thereof, a series of convex teeth integral with said handle and extending in said handle recess between said handle sides, a medial tooth of said series of handle teeth being of greater height than the remainder of said series of handle teeth and a lug extending longitudinally from said handle end face into said base bifurcated shoulder, means pivotally connecting said lug and bifurcated shoulder whereby said handle end face will ride on to and engage said bifurcated shoulder upon pivoting of said handle and the top teeth of both series of teeth will meet, stopping the pivoting of said handle towards said base and said base and handle teeth being positioned whereby corresponding teeth of each series of teeth are opposite one another when said handle top is brought towards said base top.

2. A nut cracker as claimed in claim 1, wherein said base has mounting openings extending from said base top to said base bottom.

3. A nut cracker as claimed in claim 1, wherein said connecting means is a bolt extending laterally through said bifurcated shoulder and said lug and in threaded engagement with said bifurcated shoulder.

References Cited

UNITED STATES PATENTS

| | | | |
|---|---|---|---|
| 1,129,213 | 2/1915 | McEwan | 146—13 |
| 1,268,484 | 6/1918 | Olasz | 146—13 |
| 1,649,468 | 11/1927 | Greene | 146—13 |
| 1,710,629 | 4/1929 | Lindsey | 146—13 |
| 2,269,052 | 1/1942 | Colvin | 146—13 |

FOREIGN PATENTS 582,559   8/1933   Germany.

W. GRAYDON ABERCROMBIE, *Primary Examiner.*

WILLIAM W. DYER, Jr., *Examiner.*